United States Patent [19]

Tolliver et al.

[11] 4,122,228

[45] Oct. 24, 1978

[54] STIRRUP FABRIC

[75] Inventors: Wilbur E. Tolliver, Holland; Daniel J. Borodin, Detroit, both of Mich.

[73] Assignee: New York Wire Mills Corp., Tonawanda, N.Y.

[21] Appl. No.: 787,104

[22] Filed: Apr. 13, 1977

[51] Int. Cl.[2] .......................... B32B 3/06; B32B 5/12; E04C 5/16; B21F 27/00
[52] U.S. Cl. ................................... 428/101; 428/107; 428/120; 428/542; 52/719; 52/DIG. 7; 245/2; 264/228; 138/174
[58] Field of Search ............... 428/101, 107, 109, 120, 428/542; 138/174, 175, 176; 52/719, DIG. 7; 245/2, 3, 8, 9; 264/228

[56] References Cited

U.S. PATENT DOCUMENTS

| 3,815,642 | 6/1974 | Henry et al. | 138/175 |
| 3,840,054 | 10/1974 | Tolliver | 138/175 |
| 3,857,416 | 12/1974 | Borodin et al. | 138/175 |

*Primary Examiner*—William R. Dixon, Jr.
*Attorney, Agent, or Firm*—Christel & Bean

[57] ABSTRACT

The specification discloses a reinforcing fabric for concrete or the like and a method for making the same in which stirrup members are joined to the fabric by rigid joining members such that the stirrup members are retained generally in the plane of the fabric. The joining members are bendable, however, such that the stirrup members can be rotated to an erect position projecting away from the plane of the fabric. In an alternative embodiment, individual stirrup projections are joined to the fabric and are made of rigid but bendable materials so that they can individually be bent out of the general plane of the fabric.

14 Claims, 11 Drawing Figures

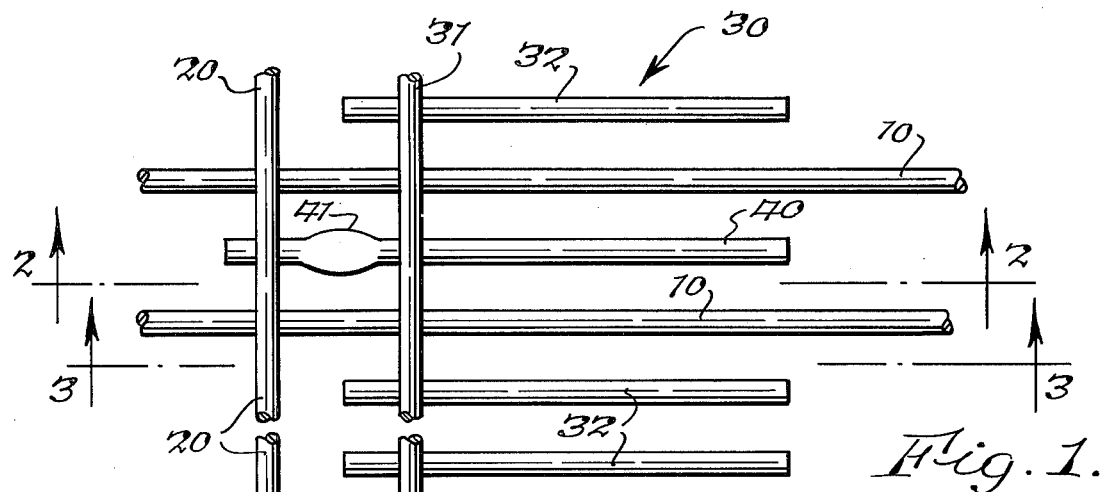
Fig. 1.
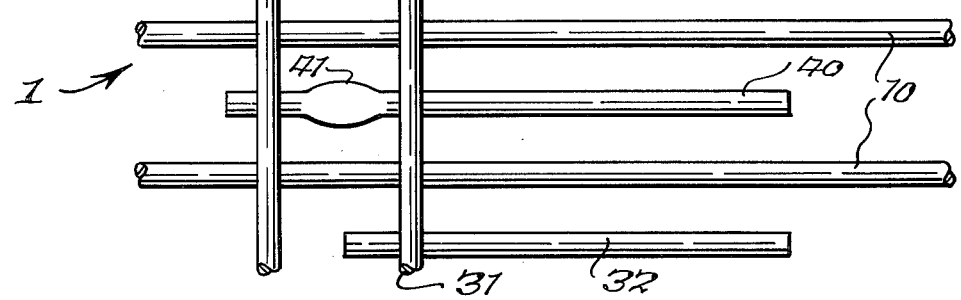
Fig. 2.
Fig. 3.
Fig. 4.
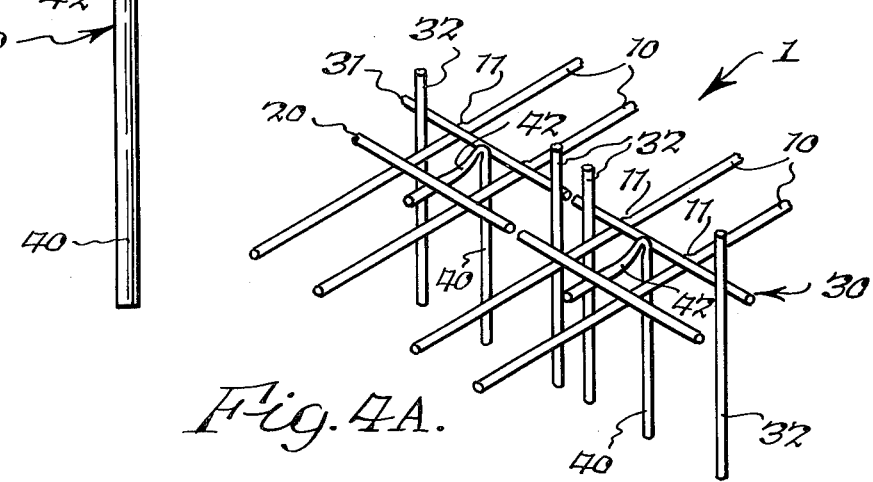
Fig. 4A.

STIRRUP FABRIC

BACKGROUND OF THE INVENTION

The present invention relates to fabric for reinforcing concrete, as for example concrete pipe and the like. It is particularly related to fabric in which stirrups are used as additional reinforcement.

Stirrups comprise projections, usually of wire rod, out of the general plane of the fabric itself. Where the fabric is laid flat, the stirrups project generally upwardly or downwardly therefrom and provide additional reinforcement when the concrete is cast therearound. When the fabric is rolled into cages for reinforcing pipe, the stirrups project generally radially outwardly or inwardly from the cage with respect to the center of the pipe. Typically, the projections are secured to the fabric just prior to casting concrete therearound. The individual stirrups are usually welded to the fabric. Generally sinusoidal shaped stirrup segments are also available which can be welded at several spaced points along the length thereof to the fabric, thereby eliminating the need to weld each and every projection to the fabric.

In order to obviate the necessity of welding stirrups to the fabric on the job site, I have invented a fabric in which stirrup means are hingedly joined to the fabric. In this manner, the fabric can be shipped with the stirrup members already joined thereto, lying generally flat, generally in the plane of the fabric. On the job site, the stirrups can be rotated into an erect position. This invention is disclosed and claimed in my U.S. Pat. No. 3,840,054 issued Oct. 8, 1974. "STIRRUP FABRIC AND METHOD FOR FORMING PIPE REINFORCEMENT" and is assigned to the assignee of the present invention. While this invention is a tremendous advance over the prior art described above, it does suffer a drawback in that the hinges used to join the stirrups to the fabric constitute a cost factor which must be included in the price of the fabric. Further, the installation of the hinges is a cost factor the elimination of which would be desirable.

SUMMARY OF THE INVENTION

In the present invention, all of the above discussed difficulties and drawbacks are obviated by fabric having stirrup segments joined thereto by a joining means which is sufficiently rigid to hold the stirrup members generally in the plane of the fabric, but which is also bendable so that the stirrup member can be erected by bending the joining means. This eliminates the need for welding stirrups in place on the job site and it eliminates the need for installing costly hinges.

Preferably, the joining means include a score line to facilitate bending. Also, the fabric is perferably provided with detent means in the form of raised dimples which aid in holding the stirrups in their erected position.

In yet another aspect of this invention, I have provided a method for manufacturing such fabric in which standard fabric, having a network of first and second strands, can be provided with integrally joined stirrup projections by cutting at least some of the first strands at points between adjacent second strands. These cut segments constitute individual stirrup projections which can be bent upwardly on the job site to provide projecting stirrups. This bending operation can be facilitated by joining a tie rod to those of the first strands which are to be cut, thereby causing all cut segments joined to a particular tie rod to bend upwardly when any one of them is bent upwardly.

These and other features, objects and advantages of the invention will be more fully understood and appreciated by reference to the written specification and appended drawings.

BRIEF DESCRIPTION OF THE DRAWINGS

FIG. 1 is a plan view of fabric made in accordance with the present invention;

FIG. 2 is a cross-sectional view taken along plane 2—2 of FIG. 1;

FIG. 3 is a cross-sectional view taken along plane 3—3 of FIG. 1;

FIG. 4 is a cross-sectional view similar to that taken along plane 2—2 of FIG. 1, but with the stirrup rotated to its erect position;

FIG. 4A is a perspective of a portion of the fabric with stirrups in erect position as in FIG. 4.

DESCRIPTION OF THE PREFERRED EMBODIMENT

Figure 5:
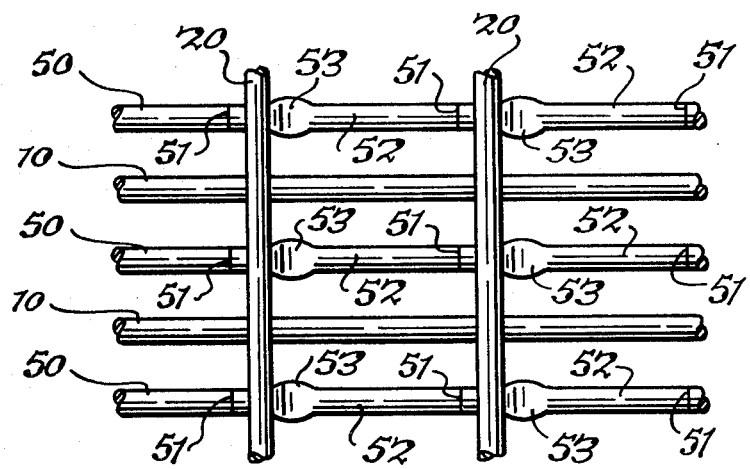
FIG. 5 is a plan view of an alternative embodiment fabric made in accordance with the present invention.

The first embodiment fabric 1 of the present invention includes a plurality of transverse wires 20 welded to a plurality of longitudinal wires 10 (FIG. 1). The terms "longitudinal" and "transverse" are somewhat arbitrary in that the same wires can have different titles depending on the use to which the fabric is put. The strands 10 are referred to as longitudinal wires at the factory where the fabric is made, since they are the wires which come off the rolls and which run continously during the fabric manufacturing process. The transverse wires 20 are laid down transversely to the longitudinal wires 10 and are welded thereto. If the fabric 1 were employed to manufacture cages for concrete pipe, however, the transverse wires 20 would become "longitudinal" wires since they would run longitudinally of the cage. The longitudinal wires 10, on the other hand, would be referred to as "circumferential wires" since they would extend circumferentially of the cage.

Joined to fabric 1 such that they lie generally in the plane of fabric 1 (FIGS. 2 and 3) are a plurality of stirrup members 30, one such stirrup member 30 being shown in FIG. 1. Each stirrup member 30 includes a tie rod 31 to which a plurality of stirrup projection rods 32 are welded. Projection rods 32 are welded generally at right angles to tie rod 31. Also welded to tie rod 31 at generally right angles thereto are at least two joining projection rods 40. The joining projection rods 40 extend beyond tie rod 31 a distance farther than any of the other projection rods 32 extend and are welded to an adjacent transverse strand 20. The portion of joining projection rods 40 which lies between the parallel transverse wire 20 and tie rod 31 is hereinafter referred to as the joining portion 41 thereof. A strike 42 is made at each joining portion 41 so that joining projection rod 40 has a narrower cross section at strike 42 such that it can be more readily bent along the score line which is defined by the strike 42 on the two joining projection rods 40.

Preferably, tie rod 31 lies on the side of fabric 1 which is opposite the side from which the projection rods 32 and 40 are to project (compare FIGS. 2 and 4). In this way, when the stirrup 30 is rotated into its erect position as shown in FIG. 4, tie rod 31 is held against the surface of the longitudinal wires 10 of fabric 1. This gives added rigidity to the overall stirrup member 30 when it is in its erect position. Also, by providing a dimple 11, by means of stamping or the like, on at least some of the longitudinal wires 10 at a point generally adjacent tie rod 31, one provides an added means for helping to maintain stirrup member 30 in its erect position. Preferably, dimple 11 is positioned immediately underneath tie rod 31 when stirrup member 30 is in its non-erect position, but slides off dimple 11 as stirrup member 30 is erected and then buts against dimple 11 when stirrup member 30 is in its erected position so that dimple 11 tends to prevent tie rod 31 from traveling back to its original position.

In operation, the fabric 1 is shipped with its various stirrup members 30 in their non-erect position, generally in the plane of fabric 1. The fabric 1 is cut to its desired size and is either laid down as a mat or is formed into a generally circular or elliptical cage for reinforcing concrete pipe. Once fabric 1 is in its operative reinforcing position, the stirrups 30 are erected by grasping one or two of the projecting rods 32 or 40 and rotating them into an erect position by effecting a bending of joining portions 41, such bending being particularly facilitated by the strikes 42.

Figure 6:
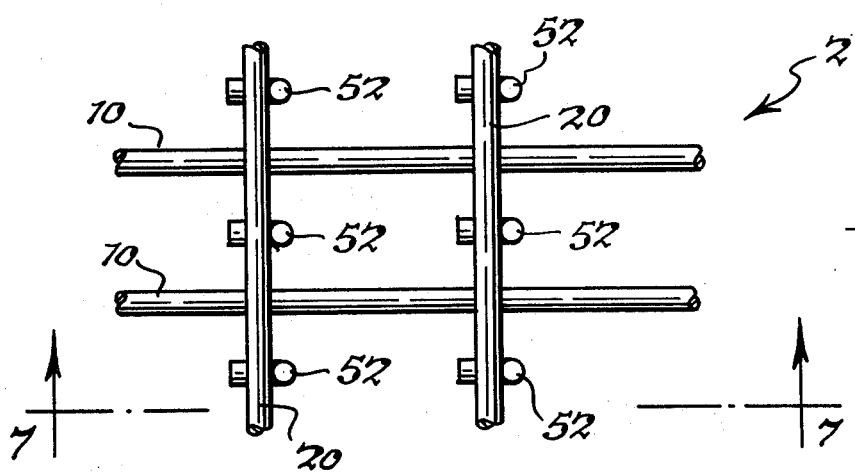
FIG. 6 is a plan view of the fabric shown in FIG. 5 with the stirrup projections rotated to an erect position.
Figure 7:
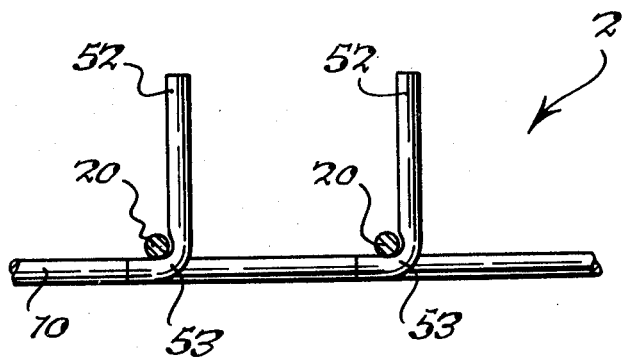
FIG. 7 is a sectional elevational view of the fabric shown in FIG. 6 and taken along line 7—7, FIG. 6.

The alternative embodiment fabric 2 shown in FIGS. 5, 6 and 7 operates in a manner similar to fabric 1. However, the stirrup projections thereof are provided through a unique manufacturing method. As with fabric 1, fabric 2 includes its longitudinal strands 10 and its transverse strands 20, all of which are capable of being bent as is customarily the case in such fabric. In addition, however, fabric 2 is provided with a set of additional longitudinal wire strands 50, all capable of being bent, thereby giving fabric 2 a greater number of longitudinal strands than would be required for conventional reinforcing purposes. These additional longitudinal strands 50 are cut, as indicated at points 51 in FIG. 5, intermediate adjacent transverse strands 20. Preferably, cuts 51 are made immediately adjacent a transverse strand 20. This divides each of the additional longitudinal strands 50 into a plurality of stirrup projection segments 52 which, once the fabric 2 is in its operative reinforcing position, can be erected into a position projecting from the plane of fabric 2 by simply bending them upwardly, (FIGS. 6 and 7). To facilitate the bending, each of the stirrup projection segments 52 is provided with a strike 53 at the base thereof, adjacent the transverse strand 20 which is opposite the transverse strand 20 at which cuts 51 are made (FIG. 5).

Figure 8:
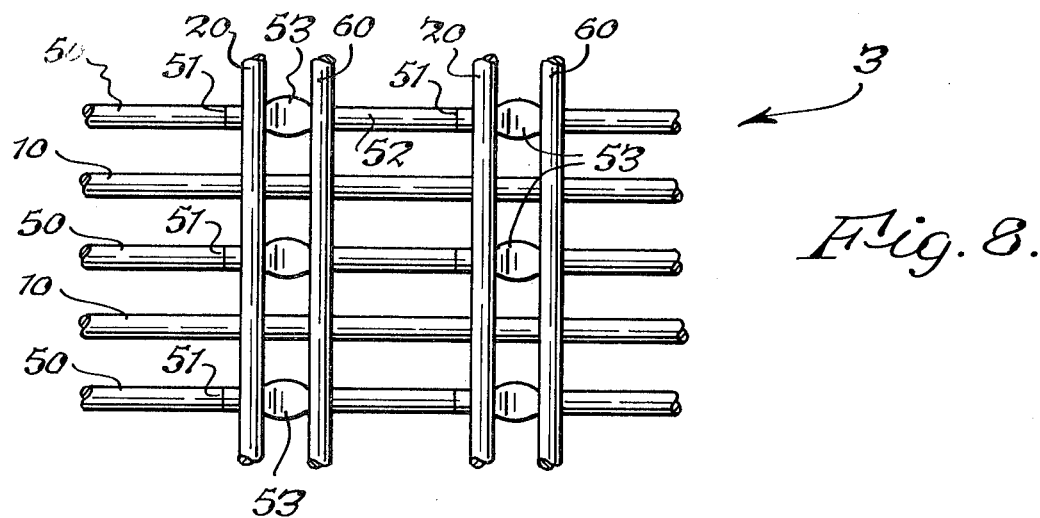
FIG. 8 is a plan view of yet a third alternative embodiment fabric made in accordance with the present invention.
Figure 9:
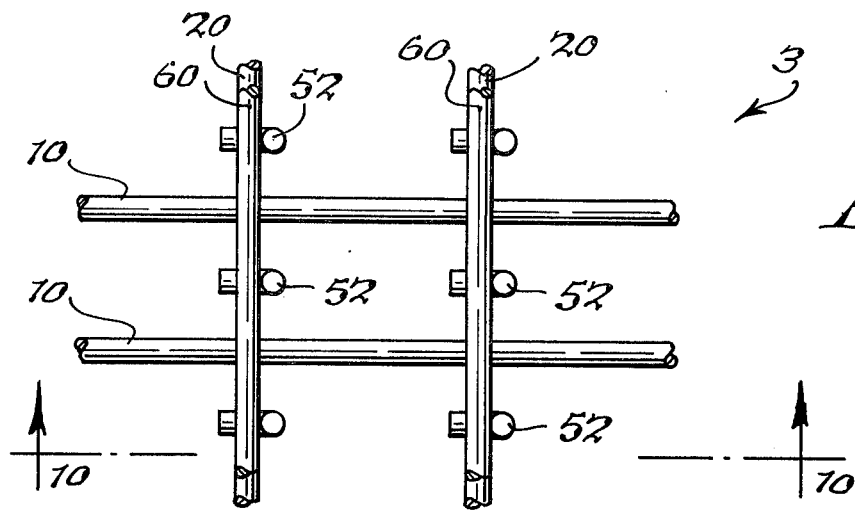
FIG. 9 is a plan view of the fabric shown in FIG. 8 with the stirrups erected.
Figure 10:
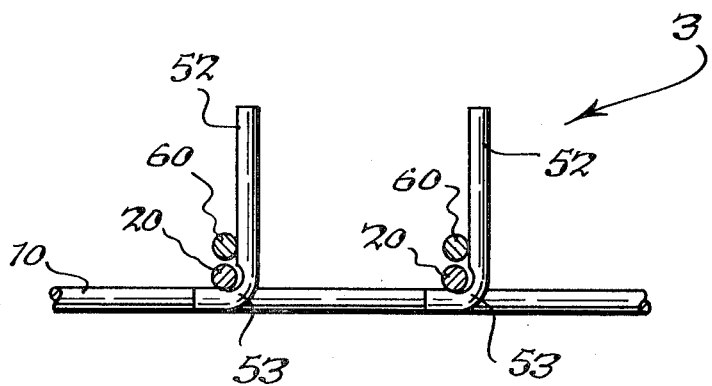
FIG. 10 is a side elevational view of the fabric with the stirrups in their erected position.

The alternative embodiment fabric 3 which is shown in FIGS. 8, 9 and 10 is a variation on fabric 2 in which a tie rod 60 is welded only to the additional longitudinal strands 50 at a point generally adjacent a transverse strand 20 which is opposite the transverse strand 20 at which cuts 51 are made. Also, enough space is left between transverse strand 20 and tie rod 60 so that strikes 53 can be made. Tie rod 60 facilitates the task of bending the stirrup segments 52 outwardly in that it creates a unitary stirrup member construction comparable to the construction of stirrup member 30 of fabric 1. By merely grasping one or two stirrup segments 52 and rotating them into an erect position, one can simultaneously effect the erection of all of the stirrup projection segments 52 which are joined to tie rod 60. While the FIGS. 9 and 10 the fabric is shown with projection segments 52 projecting away from the same side of fabric 3 to which transverse strands 20 are welded, it will be understood that they could also be rotated in the opposite direction, as has been done with stirrup member 30 of fabric 1 (see FIG. 4).

As a result of the present invention as illustrated herein by way of preferred embodiments, a manufacturer of reinforced pipe or a cement contractor can utilize stirrup projections in conjunction with his reinforcing fabric without requiring the services of a welder to individually weld the various projections or stirrup members to the fabric. The user arranges the fabric of the present invention in the manner desired and then bends the stirrups of the fabric upwardly into their operative position. Of course, it will be understood that various changes and alterations can be made to the fabric as disclosed in the preferred embodiments without departing from the spirit and broader aspects of the invention as set forth in the appended claims.

The embodiments of the invention in which an exclusive property or privilege is claimed are described as follows:

1. In a reinforcing wire fabric including a network of generally parallel first strands extending in one direction and generally parallel second strands extending in a direction generally transverse to that of the first strands, the improvement in said fabric comprising: at least one stirrup member; joining means joining said stirrup member to said fabric with said stirrup member lying generally in the plane of said fabric; said joining means being generally rigid whereby said stirrup member tends to be held in position thereby; and said joining means being bendable whereby said stirrup member can be rotated to an erect position projecting away from the plane of said fabric by effecting bending of said joining means.

2. The fabric of claim 1 in which said joining means includes a score line to facilitate bending therealong.

3. The fabric of claim 1 in which said joining means comprises at least two lengths of bendable wire rod, spaced apart from one another and being joined to said stirrup member and to said fabric.

4. The fabric of claim 3 in which said wire rod includes a strike thereon to facilitate the bending thereof.

5. The fabric of claim 1 in which said stirrup comprises a tie rod and a plurality of stirrup projections joined to said tie rod; at least two of said stirrup projections extending beyond said tie rod and being joined to said fabric to thereby define said joining means, the portion of said two stirrup projections which extends between said tie rod and said fabric comprising the joining portion of said two stirrup projections.

6. The fabric of claim 5 in which said joining portion of each of said two stirrup projections includes a strike thereon to facilitate the bending thereof.

7. The fabric of claim 6 in which at least some of the strands of said fabric on which said tie rod lies include a dimple projecting therefrom generally adjacent said tie rod whereby when said stirrup member is rotated to its erect position, said tie rod abuts said dimples and said dimples thereby aid in holding said stirrup means in its erect position.

8. The fabric of claim 7 in which said tie rod lies generally on top of said dimples when said stirrup member is in its non-erect position whereby as said stirrup member is erected by being bent through said fabric so as to project from the side thereof opposite said dimples, said tie rod slides off said dimples and into abutting relationship generally adjacent thereto such that said dimple aids in holding said stirrup member in its erect position.

9. The fabric of claim 1 in which said stirrup member includes a tie rod and a plurality of stirrup projections joined to said tie rod; said joining means being joined to said tie rod and to said fabric; at least some of the strands of said fabric on which said tie rod lies including a dimple thereon generally adjacent said tie rod whereby when said stirrup member is erected, said tie rod abuts said dimples and said dimples aid in holding said stirrup member erect.

10. In a reinforcing wire fabric including a network of generally parallel first stands extending in one direction and generally parallel second strands extending in a direction generally transverse to that of the first strands, the improvement in said fabric comprising: a plurality of stirrup projections joined to said fabric such that they lie generally in the plane of said fabric; each of said stirrup projections being rigid whereby it tends to stay in position generally in the plane of said fabric and each of said stirrup projections being bendable whereby said stirrup projections can be bent out of the plane of said fabric to provide additional reinforcement when said fabric is embedded in the material which it is to reinforce.

11. The fabric of claim 10 in which each of said stirrup projections includes a strike thereon generally adjacent the strand of said fabric to which it is attached whereby said stirrup projection can be more readily bent into its projecting position.

12. The fabric of claim 10 in which each of said stirrup projections is joined at its base to a strand of said fabric and includes a free end which is to be bent away from the fabric, said free end of each said projection being positioned immediately adjacent and in line with the base of the next adjacent projection.

13. The fabric of claim 12 in which a plurality of parallel ones of said stirrup projections are interconnected by a tie rod joined thereto whereby the simultaneous erection of all said projections which are joined to said tie rod is facilitated.

14. The fabric of claim 10 in which a plurality of parallel ones of said stirrup projections are interconnected by a tie rod joined thereto whereby the simultaneous erection of all said projections which are joined to said tie rod is facilitated.

* * * * *